United States Patent [19]
Gradnik et al.

[11] 3,723,453
[45] Mar. 27, 1973

[54] 1-(BETA-SULPHONYLOXY-ETHYL)-IMIDAZOLES

[75] Inventors: Boris Gradnik; Andrea Pedrazzoli, both of Milan; Leone Dall'Asta, Pavia, all of Italy

[73] Assignee: Societe D'Etudes de Recherches et D'Applications Scientifigues et Medicales E.R.A.S.M.E., Paris, France

[22] Filed: June 17, 1970

[21] Appl. No.: 47,142

[30] Foreign Application Priority Data

June 20, 1969 Great Britain.....................31,266/69

[52] U.S. Cl.................................260/309, 424/273
[51] Int. Cl................................................C07d 49/36
[58] Field of Search......................................260/309

[56] References Cited

FOREIGN PATENTS OR APPLICATIONS

| 36,01M | 10/1965 | France.................................260/309 |
| 836,854 | 6/1960 | Great Britain.......................260/309 |
| 1,153,347 | 5/1969 | Great Britain.......................260/309 |

OTHER PUBLICATIONS

Cosar et al., Arzneimittel–Forschund Vol. 16, pages 23–29 (1966). RS1.A8

*Primary Examiner*—Natalie Trousof
*Attorney*—George F. Dvorak

[57] ABSTRACT

1-($\beta$-Sulphonyloxy-ethyl)-imidazoles of formula

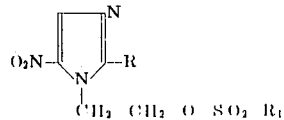

where R is hydrogen or lower alkyl and $R_1$ is an alkyl radical, a cycloalkyl radical, a substituted or unsubstituted benzyl or phenyl radical; or a tetrahydrofurfuryl radical and their pharmaceutically acceptable acid addition salts show activity against a large variety of bacteria, mycetes, pathogenic moulds and protozoa and also show a good cytostatic action vitro. They are prepared by reacting the sodium salt of a corresponding free imidazole with a sulphonyloxy-ethyl halide or a corresponding 1-($\beta$-hydroxy-ethyl)-imidazole with a sulphonyl chloride.

9 Claims, No Drawings

1-(BETA-SULPHONYLOXY-ETHYL)-IMIDAZOLES

SUMMARY OF THE INVENTION

This invention relates to novel 1-($\beta$-sulphonyloxy-ethyl)-imidazoles, more particularly to 5 nitro-1-[$\beta$-($R_1$-sulphonyloxy)-ethyl]-imidazoles having the following general formula:

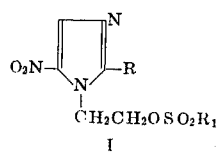

CH$_2$CH$_2$OSO$_2$R$_1$

I where R represents hydrogen or lower alkyl; $R_1$ represents an alkyl radical containing from 1 to 12 carbon atoms; a cycloalkyl radical containing from 3 to 7 carbon atoms such as cyclopropyl, cyclobutyl, cyclopentyl, cyclohexyl, cycloheptyl; a benzyl radical which may be substituted in its phenyl ring with, for example, a halogen atom, such as fluorine, chlorine and bromine, or a lower alkyl or lower alkoxy radical, or a nitro group; a phenyl radical which may be substituted with, for example, a halogen atom, such as fluorine, chlorine and bromine, or a lower alkyl or lower alkoxy radical, or a nitro group; or a tetrahydrofurfuryl radical; and to pharmaceutically acceptable acid addition salts thereof. The novel compounds of formula I above and their salts possess a good activity against bacteria, mycetes, pathogenic moulds and protozoa and also show cytostatic activity in vitro.

DETAILED DESCRIPTION OF THE INVENTION

The term "lower alkyl" as used herein, includes saturated aliphatic hydrocarbon radicals containing up to 3 carbon atoms, such as methyl, ethyl, propyl and isopropyl. The term "lower alkoxy" means a hydroxy group in which the hydrogen atom is substituted by a lower alkyl radical as hereinbefore defined.

The term "alkyl radical containing from 1 to 12 carbon atoms" includes straight and branched chain saturated hydrocarbon residues containing up to 12 carbon atoms such as, for example, methyl, ethyl, n-propyl, isopropyl, n-butyl, isobutyl, sec.butyl, tert.butyl, n-pentyl, 2-methyl-butyl, 3-methyl-butyl, n-hexyl, n-heptyl, n-octyl, 2,2,4-trimethyl-pentyl, n-nonyl, n-decyl, n-dodecyl.

Suitable pharmaceutically acceptable acid addition salts are those derived from inorganic or organic acids, such as hydrochloric, hydrobromic, hydriodic, sulphuric, phosphoric, acetic, lactic, tartaric acids, the hydrohalides, such as hydrochlorides, hydrobromides, hydriodides being particularly preferred.

The compounds of formula I are prepared by condensation between 20° and 160°C for 1 to 18 hours in an inert solvent, the sodium salt of the 5-nitroimidazole of formula:

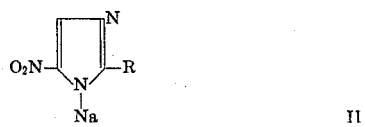

II where R is defined as hereinabove with a $\beta$-sulfonyloxy-ethyl halogen of formula:

$$X - CH_2-CH_2-O-SO_2-R_1 \qquad III$$

where $R_1$ is defined as hereinabove and X represents a halogen atom, said condensation being capable of being effected in two steps by reaction of a $\beta$-hydroxyethane halogen on the sodium salt II then a chloride of formula:

$$Cl-SO_2-R_1 \qquad V$$

where $R_1$ is defined as hereinabove, the compounds I thus obtained being capable of being converted into acid addition salts.

According to one aspect of the invention, the compounds I are obtained according to the direct reaction scheme.

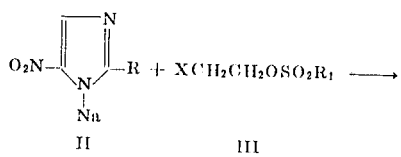

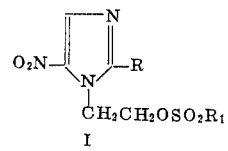

CH$_2$CH$_2$OSO$_2$R$_1$

I

According to this scheme the sodium salt II is reacted with the sulphonic derivatives III in an inert solvent, such as benzene, toluene, xylene, heptane, cyclohexane, dimethylformamide or dimethylsulphoxide at a temperature of from 50° to 160° C, preferably from 130° to 140°C, for a period of time ranging from 2 to 18 hours, preferably from 6 to 9 hours. The reaction product is isolated according to methods well known in the art, for example by concentrating the organic phase and crystallizing the residue from a suitable solvent.

According to another aspect, the sodium salt II is converted into 5-nitro-1-($\beta$-hydroxyethyl)-imidazole IV by using the known methods, then operation is carried out according to the reaction scheme.

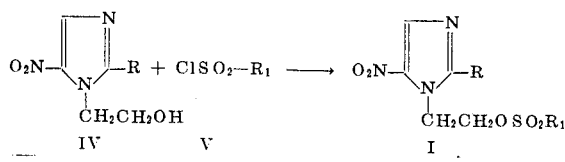

where R and $R_1$ have the same meanings as above.

In this case, the reaction is carried out in an inert solvent, such as benzene, toluene, xylene, hexane, heptane, cyclohexane, dimethoxyethane or tetrahydrofuran, in the presence of a base, preferably a tertiary amine, such as triethylamine, pyridine, dimethylaniline, at a temperature of from 20° to 70°C, preferably 20° to 40°C, for a period of time of from 1 to 10 hours, preferably from 2 to 4 hours. The reaction can also be carried out in the same base used as condensing agent; in this case, the compound IV is first dissolved with heating in the selected base and then reacted with the appropriate sulphonyl chloride under the conditions set forth above.

The end products can be isolated according to methods well known in the art, for example by filtering the reaction mixture to separate the chloride of the base used, concentrating the organic phase and finally crystallizing the residue obtained from a suitable solvent.

The compounds of the invention can then be transformed into their salts by reaction with mineral or organic acids, such as hydrochloric acid, hydrobromic acid, sulphuric acid, acetic acid, lactic acid, tartaric acid or citric acid according to methods well known in the art.

The substituted 5-nitro-imidazoles of the invention show activity against a large variety of bacteria, mycetes, pathogenic moulds, and protozoa. They are particularly active against *Trichomonas vaginalis*, *Trichomonas foetus* and *Entamoeba histolytica*. The compounds of the present invention can be used as antimicrobic agents and, in this connection, they are more suitable for clinical use than 2-methyl-5-nitro-1-(β-hydroxyethyl)-imidazole, a very commonly used antiprotozoal compound. More particularly, they are at least as active as 2-methyl-5-nitro-1-(β-hydroxyethyl)-imidazole, but have a lower toxicity, particularly a lower chronic toxicity. For example, it has been found that a representative compound of the present invention, 1-[β-(methylsulphonyloxy)-ethyl]-2-methyl-5-nitro-imidazole, can be administered orally to mice at doses of 1500 mg/kg/die for 3 months without giving any side effect to the treated animals. On the contrary all mice treated with two thirds of this dose of 2-methyl-5-nitro-1-(β-hydroxyethyl)-imidazole, i.e. 1000 mg/kg/die, dead within the first 30–40 days under a big nervous symptomatology.

In addition, the compounds of the invention show a good cytostatic activity in vitro; for example, 1-[β-(methylsulphonyloxy)-ethyl]-2-methyl-5-nitro-imidazole is able to inhibit the growth of HB cells at concentrations of 1γ/ml. At 100-fold higher concentrations, i.e. at 100γγ/ml, 2-methyl-5-nitro-1-(β-hydroxyethyl)-imidazole does not have any inhibiting action.

The new compounds may be administered by oral, parenteral, or topical route or in form of suppositories. When given systemically, for example orally, the dosages vary from 1 to 40 mg/kg of body weight according to individual requirements. They can be administrered in conventional pharmaceutical forms in association with conventional inert, organic or inorganic pharmaceutical carriers suitable for enteral, parenteral or topical application, such as, for example, water, gelatine, lactose, starch magnesium stearate, vegetable oils, gum arabic polyalkylene glycols, petroleum jelly or other appropriate carriers. They may also be mixed with preservatives, stabilizers, emulsifying agents or humectives or they may be formulated with any other substances of therapeutic use.

The pharmaceutical preparations can be in conventional solid forms such as tablets, capsules, suppositories, lozenges and the like and in conventional liquid forms such as solutions, suspensions, emulsion and the like.

In order further to illustrate the invention the following Examples are given.

EXAMPLE 1

15.7 grams (0.1 mole) 5-nitro-1-(β-hydroxyethyl)-imidazole were dissolved, with heat in 150 ml of anhydrous pyridine. The solution was cooled to 0°C and 11.45 grams (0.1 mole) methanesulphonyl chloride was dropped thereinto over a period of 10 minutes at a temperature between 0° and 5°C. The solution was removed from the water bath and left at room temperature for 2 hours. The solution was then cooled, filtered and washed first with pyridine and then with ethyl ether. The solid was recrystallized from 50 percent ethanol to give 17.2 grams of 1-[β-(methyl-sulphonyloxy)-ethyl]-5-nitro-imidazole; m.p. 92°–95°C.

By reacting the compound thus obtained with an alcoholic solution of hydrogen chloride the corresponding hydrochloride was obtained.

EXAMPLE 2

A solution of 12.7 grams (0.1 mole) 2-methyl-4(5)-nitro-imidazole in 50 ml of methanol was treated with 5,4 grams (0.1 mole) of sodium methoxide, than heated at reflux for 30 minutes and evaporated under vacuum to dryness. The solid was taken up with 200 ml of anhydrous toluene and to the suspension thus obtained 16 grams (0.1 mole) of β-(methyl-sulphonyloxy)-ethyl chloride was added. The resulting mixture was heated to reflux for 7 hours, then filtered and the filtrate was washed with water, dried and concentrated under vacuum. The residual oil (11 grams) was treated with ether and 5.2 grams of a witish product having melting point of 140°–151°C was obtained. This was recrystallized from 95° ethanol to obtain 4.9 grams 1-[β-(methyl-sulphonyloxy)-ethyl]-2-methyl-5-nitro-imidazole M.p. 154°–156°C.

By treating the compound thus obtained with hydrogen chloride in ethanolic solution the corresponding hydrochloride was prepared. Analogously the corresponding hydrobromide, hydriodide and sulphate were obtained.

EXAMPLE 3

17.1 grams (0.1 mole) 1-(β-hydroxyethyl)-2-methyl-5-nitroimidazole were dissolved, with heating, in 150 ml of anhydrous pyridine. The solution was cooled to 0°C and 11.45 grams (0.1 mole) of methane sulphonyl chloride was dropped thereinto over a period of 15 minutes at the temperature between 0° and 5°C. The solution was removed from the water bath and maintained at room temperature for 1 hour. It was then cooled filtered and washed first with pyridine and then with ethyl ether. The solid was recrystallized from 50 percent ethanol to give 21.2 grams of 1-[β-(methyl-sulphonyloxy)-ethyl]-2-methyl-5-nitro-imidazole; m.p. 154°–156°C.

By treating the compound thus obtained with lactic acid in ethanol the corresponding lactate was obtained. In the same manner the corresponding tartrate, citrate and acetate were prepared.

EXAMPLE 4

A solution of 12.7 grams (0.1 mole) of 2-methyl-4(5)-nitro-imidazole in 50 ml of methanol was treated with 5.4 grams of sodium methoxide, then heated to reflux for 30 minutes and evaporated under vacuum to dryness. The solid was taken up with 200 ml of anhydrous xylene and to the suspension thus obtained 23 grams (0.1 mole) of β-(benzylsulphonyloxy)-ethyl chloride was added. The mixture was heated to reflux for 5 hours, then filtered and the filtrate was washed with water, dried and concentrated under vacuum. The residual oil was recrystallized twice from ethanol to obtain 7.8 grams of 1-[β-(benzylsulphonyloxy)-ethyl] -2-methyl-5-nitro-imidazole; m.p. 113°–115°C.

By operating according to the procedure set forth in Examples 1–4 the following compounds have been prepared.

| Example | R | $R_1$ | M.p.(°C) | Crystallization solvent |
|---|---|---|---|---|
| 5 | $CH_3$ | $-CH_2CH_3$ | 112°–114° | ethanol 50 percent |
| 6 | $CH_3$ | $-CH_2CH_2CH_2CH_3$ | 81°–µ° | ethanol 50 percent |
| 7 | $CH_3$ | 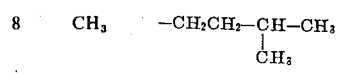 | oil | |
| 8 | $CH_3$ | 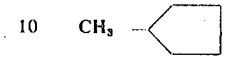 | | |

| Example | $R_1$ | Mp. (°C) | Crystallization solvent |
|---|---|---|---|
| 9 | $CH_3$ $-CH_2-(CH_2)_{10}-CH_3$ | 64–67° | isopropanol/ isopropyl ether |
| 10 |  | 75°–77° | ethanl 50% |
| 11 | $CH_3$ | 125°–127° | isopropanol/ ethyl ether |
| 12 | 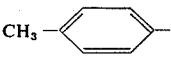 | 158°160° | ethanol 50% |

We claim:
1. A member selected from the group consisting of (a) a compound of formula

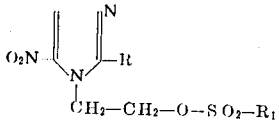

wherein R is hydrogen or lower alkyl of 1-3 carbon atoms and wherein $R_1$ is alkyl of from 1 to 12 carbon atoms; or cycloalkyl of from 3 to 7 carbon atoms; and (b) a pharmaceutically acceptable acid addition salt thereof.

2. A member selected from the group consisting of (a) 1-[β-methylsulphonyloxy)-ethyl]-2-methyl-5-nitro-imidazole and (b) a pharmaceutically acceptable acid addition salt thereof.

3. 1-[β-(methylsulphonyloxy)-ethyl]-5-nitro-imidazole 4. 1-[β-(ethylsulphonyloxy-ethyl]-2-methyl-5-nitro-imidazole.

5. 1-[β-(n-butylsulphonyloxy)-ethyl]-2methyl-5-nitro-imidazole.

6. 1-[β-(1′-methyl-propylsulphonyloxy)-ethyl]-2-methyl-5-nitroimidazole.

7. 1-[β(3′-methyl-butyl-sulphonyloxy)-ethyl]-2-methyl-5nitroimidazole.

8. 1-[β-(n-dodecylsulphonyloxy)-ethyl]-2-methyl-5 nitro-imidazole.

9. 1-[β-(cyclopentyl-sulphonyloxy)-ethyl]-2-methyl-5nitroimidazole.

* * * * *